US006674960B2

(12) United States Patent
Duran et al.

(10) Patent No.: US 6,674,960 B2
(45) Date of Patent: *Jan. 6, 2004

(54) COMPUTER CONTROLLED RECORDER OF TELEVISION SIGNALS HAVING THE ABILITY FOR A USER TO SELECT AMONG A VARITY OF STORED SIGNALS FOR PLAYBACK INDEPENDENT OF RECORDING OF AN AUDIO AND VIDEO STREAM

(75) Inventors: Joe W. Duran, Austin, TX (US); Michael Vayden Jenkins, Austin, TX (US); William Todd Clayton, Austin, TX (US)

(73) Assignee: Forgent Networks, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/264,749

(22) Filed: Oct. 4, 2002

(65) Prior Publication Data

US 2003/0026398 A1 Feb. 6, 2003

Related U.S. Application Data

(63) Continuation of application No. 09/894,051, filed on Jun. 28, 2001, now Pat. No. 6,480,584, which is a continuation of application No. 09/757,392, filed on Jan. 8, 2001, now Pat. No. 6,285,746, which is a continuation of application No. 09/490,905, filed on Jan. 25, 2000, now Pat. No. 6,181,784, which is a continuation of application No. 08/425,729, filed on Apr. 20, 1995, now abandoned, which is a continuation of application No. 08/158,045, filed on Nov. 24, 1993, now abandoned, which is a continuation of application No. 07/703,685, filed on May 21, 1991, now abandoned.

(51) Int. Cl.[7] ............................................. H04N 5/781
(52) U.S. Cl. ........................................... 386/96; 386/125
(58) Field of Search ................. 379/93.01, 93.04–93.09, 379/93.14–93.26, 110.01, 202.01–206; 348/14.08–14.11; 386/39, 45, 96–107, 125–126; 360/7; H04N 5/76, 9/79, 5/92, 5/781

(56) References Cited

U.S. PATENT DOCUMENTS

| 4,531,182 | A | * | 7/1985 | Hyatt ............................ 700/2 |
| 4,750,034 | A | | 6/1988 | Lem ............................ 725/22 |
| 4,777,537 | A | * | 10/1988 | Ueno et al. .................. 386/101 |
| 4,935,954 | A | | 6/1990 | Thompson et al. ....... 379/88.04 |
| 5,126,982 | A | * | 6/1992 | Yifrach ........................... 360/7 |
| 5,132,992 | A | * | 7/1992 | Yurt et al. ................... 375/240 |
| 5,206,929 | A | | 4/1993 | Langford et al. ............. 386/52 |
| 5,241,428 | A | * | 8/1993 | Goldwasser et al. ........... 360/7 |
| 6,181,784 | B1 | * | 1/2001 | Duran et al. ............. 379/93.21 |
| 6,285,746 | B1 | * | 9/2001 | Duran et al. ............. 379/93.21 |
| 6,480,584 | B2 | * | 11/2002 | Duran et al. ............. 379/93.21 |

* cited by examiner

Primary Examiner—Thai Tran
(74) Attorney, Agent, or Firm—Jenkens & Gilchrist a Professional Corporation

(57) ABSTRACT

A computer based television signal recording device is provided. This recording device allows for the recording of input streams onto a mass storage device such as a computer hard drive. The playback of individual programs can be done independently of the recording. A user interface is provided which has a list of the recorded television signals and the user can select for playback any of the listed recorded television signals.

7 Claims, 11 Drawing Sheets

COMPUTER CONTROLLED RECORDER OF TELEVISION SIGNALS HAVING THE ABILITY FOR A USER TO SELECT AMONG A VARITY OF STORED SIGNALS FOR PLAYBACK INDEPENDENT OF RECORDING OF AN AUDIO AND VIDEO STREAM

This application is a continuation of application Ser. No. 09/894,051, filed Jun. 28, 2001, now U.S. Pat. No. 6,480,584 which is a continuation of application Ser. No. 09/757,392, filed Jan. 8, 2001, now U.S. Pat. No. 6,285,746, which is a continuation of application Ser. No. 09/490,905, filed Jan. 25, 2000, now U.S. Pat. No. 6,181,784 B1, which is a continuation of application Ser. No. 08/425,729, filed on Apr. 20, 1995, now abandoned, which is a continuation of application Ser. No. 08/158,045, filed on Nov. 24, 1993 now abandoned, which is a continuation of application Ser. No. 07/703,685 filed on May 21, 1991 now abandoned.

This invention is in the field of telecommunications, and is more specifically directed to communication systems using multiple media.

BACKGROUND OF THE INVENTION

In the business world, face-to-face meetings generally include the exchange of information by way of various media. Obvious modes of interpersonal information exchange include voice and visual communication. In addition, documents are often exchanged or examined by the meeting participants, slides or viewgraphs may be shown and discussed in presentations, and drawings are often made on paper or a board, accompanied by an oral explanation. Modern meetings and conferences also can involve discussion of data processed by a computer, such as the results of spreadsheet calculations. The ability to communicate one's point using the most effective medium available, together with the opportunity to observe participants' reactions, cause many people to favor face-to-face meetings over communication by mail, FAX, or telephone.

Systems have recently become available which enable the conducting of meetings and conferences over long-distances, communicating not only audio information but also video, documents, graphics, and other types of information. Complex systems for accomplishing such meetings include satellite or other closed-circuit television techniques. Such television-based systems are relatively costly to set up and operate, primarily due to the costs of transmission of the information.

The speed, accuracy and reliability of communication over telephone lines, particularly digital telephone networks, has now improved to the extent that video and graphics information can be transmitted thereover, at sufficiently high rates that real-time teleconferencing can include audio, video, and computer graphics information. The ability to communicate multiple medium presentations has made video teleconferencing much more attractive to the participants, reducing the need of personnel to travel or relocate for effective communications and management.

An example of a modern teleconferencing system is the CS420R system manufactured and sold by VideoTelecom Corporation of Austin, Tex. This system provides real-time multiple-way communication of multiple medium information over conventional digital telephone networks. The media include audio and video, with the video information generated by the digitization of the output of a video camera. Other information communicated by this system includes computer-generated data, for example spreadsheet data, computer graphics, and interactive graphics data input by way of a graphics pad, mouse, or other input device. Documents can also be communicated in real-time according to this system, by way of facsimile, so that the conference participants may refer to the same document during the meeting. Other media include digitized still images, digital information from CD-ROM, and other known information media in the industry. Additional technical detail regarding the CS420R system is provided in Duran, et al., "A PC-compatible, multiprocessor workstation for video, data, and voice communication", *Visual Communications & Image Processing IV*, William A. Perlman, ed., (SPIE, 1989), pp. 232–236, incorporated herein by reference.

As in the case with telephonic communication, however, an interactive conference requires that the parties each be connected to the system at the same time. Scheduling conflicts, time zone differentials, and other events which prevent parties from meeting face-to-face, also preclude meeting by phone or teleconference. These factors have presented the need for storage and retrieval of messages. Currently available systems for storage of audio messages include simple answering machines and complex voice mail systems, are now widely available. Another example of a well-known storage system for long-distance messages is a computer bulletin board, upon which various types of computer data may be stored. Of course, these systems are each limited to the storage and delivery of a single type of message. Particularly in today's complex worldwide business climate, it is desirable to transmit and store full multiple-media presentations for later retrieval.

It is therefore an object of this invention to provide a system for transmission of a multiple medium message, and for storage of the transmitted message for later retrieval.

It is a further object of this invention to provide such a system where the media include audio, video, graphics, and any other information which may be acquired or generated by a computer and stored in computer-accessible memory.

It is a further object of this invention to provide such a system which utilizes existing teleconferencing hardware.

Other objects and advantages of the invention will become apparent to those of ordinary skill in the art having reference to the following specification together with its drawings.

SUMMARY OF THE INVENTION

The invention may be implemented into a teleconferencing system which receives and stores digital information representative of information from multiple media. The system includes a communications multiplexer which, during normal transmission, routes incoming information to the proper output processors and devices in the system. The system is programmable to receive and store an incoming message by controlling the communications multiplexer to route the incoming information to disk storage. In playback, the communications multiplexer receives the stored information, and routes the appropriate portions thereof to the proper output devices in a similar manner as in normal transmission.

DETAILED DESCRIPTION OF THE PREFERRED EMBODIMENT

Figure 1:
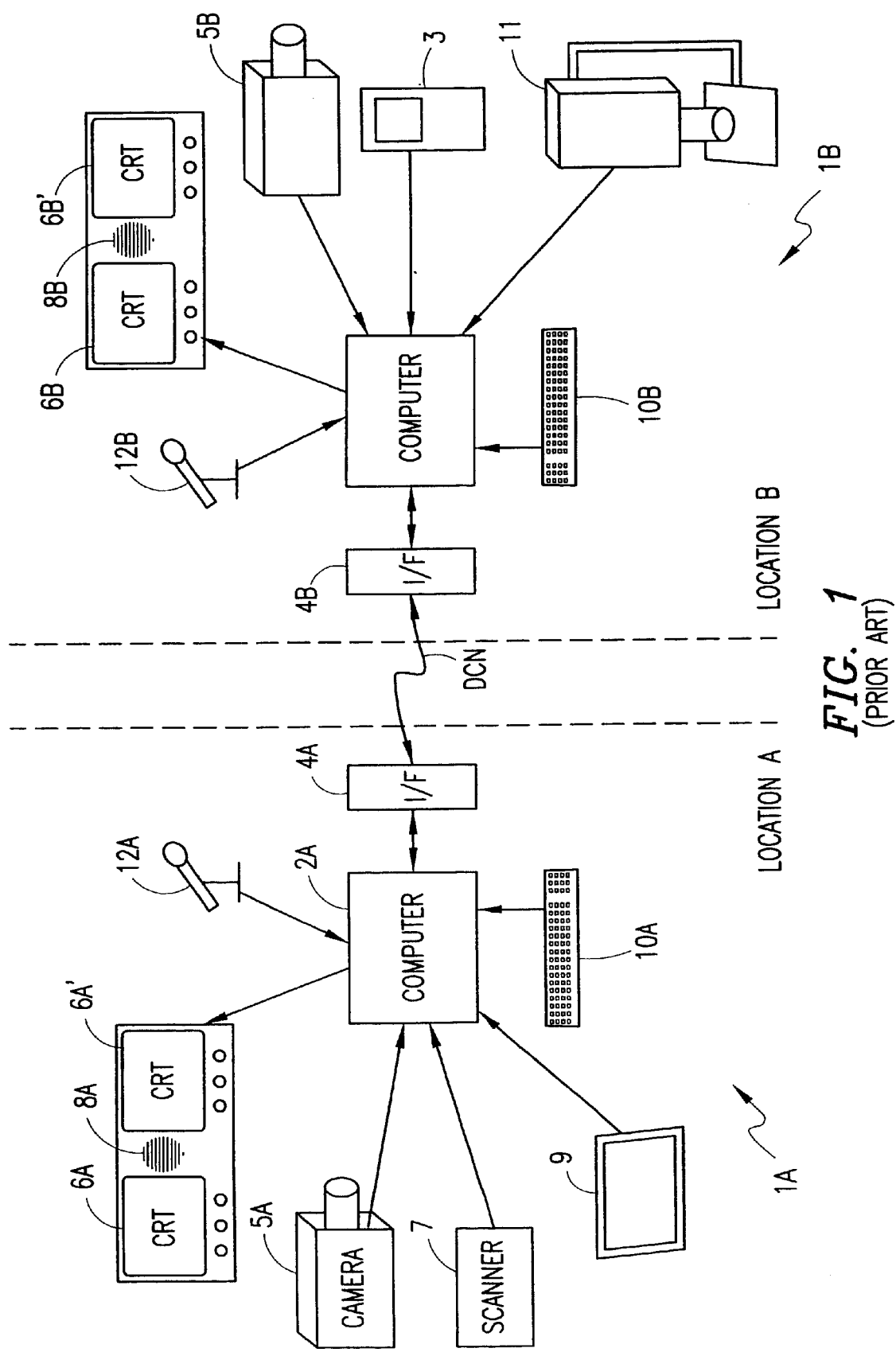
FIG. 1 is an electrical diagram, in block form, of a conventional two-way teleconferencing system and its various input and output devices.

Referring now to FIG. 1, a teleconferencing system according to the preferred embodiment of the invention will be described in the context of a two-party video teleconference. It should be understood, however, that multiple party teleconferences are also commonplace and will benefit from the present invention. A video teleconferencing system 1, such as the CS420R system noted above, is located at each of locations A and B of FIG. 1. Connection between the systems at locations A and B is made by way of a conventional digital communications network DCN, as is prevalent in the world today; accordingly, locations A and B may be in different cities, or even different countries.

Each system 1 includes a main computer 2, which connects to network DCN by way of conventional interface 4. Computer 2, in the CS420R system noted hereinabove, is configured in the chassis of a conventional personal computer such as an IBM PC AT, but includes significant additional video and other data processing capability. Computer 2 further includes communications hardware, as will be described in further detail hereinbelow, for interfacing to the various input and output devices at each location. It should be noted that modern output devices often include audio or video decoding, and also processing capability for performing other types of data processing, some of which may be quite complex. In the example of FIG. 1, each system 1 includes CRT monitors 6 for displaying both video from the other system and another image, such as computer graphics; in a "preview" mode, monitors 6 may also display information for transmission from its own system 1. Alternatively, different visual output, such as still images, motion video, computer graphics and control information, may be displayed in windows on a single monitor 6, or monitor 6 may be switchable among the various displays. Speaker 8 is also provided for each system 1 for output of audio information. Each system 1 also includes video camera 5 for acquiring the video image, microphone 12 for pickup of audio, usually of the teleconference participants, and keyboard 10 for entry of computer data for communication to the other location, as well as for entry of commands for computer 2 to control the teleconference transmission and receipt.

Other input devices include an interactive graphics input device 9, such as the Pen Pal Graphics™ input tablet and stylus system available from VideoTelecom Corporation, for entry of graphics information that can overlay other image information sent to the other system 1B. A document scanner 7, such as the scanning input to a conventional FAX machine, provides input of documentary information for display on the other system 1B. Additional input devices include instrument 3, such as an oscilloscope or other data acquisition device, and a video copy stand 11 which includes a video camera supported so as to view drawings or handwriting by one of the conference participants at location B. Other input and output devices may also be used in connection with systems 1.

Figure 2:
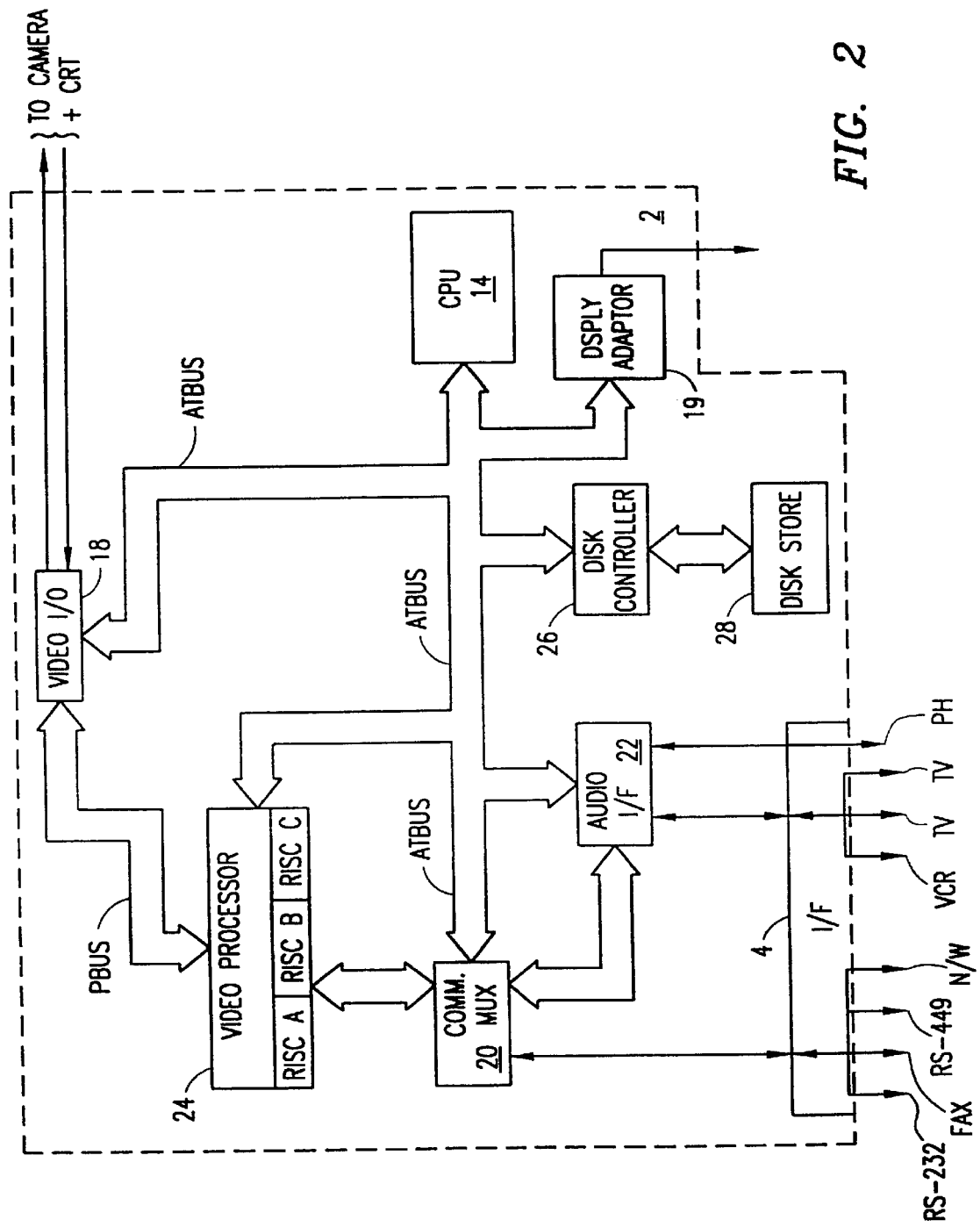
FIG. 2 is an electrical diagram, in block form, of a computer in the system of FIG. 1, according to the preferred embodiment of the invention.

Referring now to FIG. 2, the construction of computer 2 in system 1 will now be described in further detail. The Duran et al. paper incorporated herein by reference also provides additional detail relative to computer 2. Computer 2, as noted hereinabove, is implemented into the chassis of an IBM PC AT or equivalent personal computer. The conventional portion of computer 2, including the central processing unit, main memory and the like, is illustrated in FIG. 2 as CPU 14. Connected to CPU 14 is bus ATBUS, for communication of information between CPU 14 and the various other units within computer 2 according to this embodiment of the invention.

Connected to bus ATBUS is video I/O 18, which includes conventional circuitry for driving a display device such as an RGB monitor, and also includes conventional digitizing circuitry for receiving video information from a video camera and presenting the same to a computer. Accordingly, video I/O 18 is coupled between the video input and output units (i.e., camera and graphics monitor, respectively) and bus ATBUS. Video I/O 18 also includes a FIFO or other conventional buffer for facilitating communications to and from bus ATBUS. Also connected to bus ATBUS is display adaptor 19, which is a conventional adaptor (such as a VGA adaptor as is well known in the computer art), which can directly drive a display device, particularly in text mode.

In the example of FIG. 2, interface 4 receives digital communication from, and provides digital information to, various ports. During a teleconference, and especially during transmission of a message for storage as will be described hereinbelow, it is contemplated that the bulk of the transmission will be via a primary network port (shown as network port N/W in FIG. 2). This network port may be configured according to various standards; for example, the preferred network port N/W allows for selection between an RS-449 port or a pair of V.35 ports, depending upon the type of transmission desired. In addition, several user ports are also provided. These user ports include conventional RS-449 and RS-232 ports, and also a conventional FAX port. These user ports are available for parallel usage during a teleconference; for example, if one party wishes to send a FAX during a teleconference, the transmitted FAX information can be time-multiplexed into the teleconference bit stream, with the FAX port on the receiving end capable of decoding the FAX information from the multiplexed bitstream. In addition, while audio information is also preferably multiplexed into the teleconference bit stream, audio interface 22 is also itself coupled to interface 4 to receive parallel telephonic communication , as well as providing communication from a microphone input, and to and from VCR and television devices.

Audio interface 22 includes one or more digital signal processor chips, such as a TMS 320C25 digital signal processor manufactured and sold by Texas Instruments Incorporated, to provide audio coding and decoding, as well as other audio information processing such as echo cancellation, an example of which is described in U.S. Pat. No. 4,965,822, assigned to VideoTelecom Corporation and incorporated herein by reference. Audio interface 22 is connected directly to communications multiplexer 20, and also to bus ATBUS.

Communications multiplexer 20 is also connected to bus ATBUS. Communications multiplexer 20 is for receiving input teleconference data from interface 4, and from audio interface 22, and routing the information to the proper location within computer 2, and for also receiving information from its own system and presenting the same to interface 4 for transmission to other systems in the teleconference. The detailed construction of communications multiplexer 20 will be described hereinbelow.

For video data received at interface 4, communications multiplexer 20 is coupled to video processor 24 which decodes and processes the received video information into a form suitable for display on monitors 6. A preferred example of video processor 24 is a chip set including three i965CA RISC processors manufactured and sold by Intel Corporation, an A121 Discrete cosine Transform circuit manufactured and sold by Inmos, and additional conventional circuitry useful in motion estimation. In this arrangement, video processor 24 is coupled to bus ATBUS to receive instructions and control information from CPU 14, and is also coupled to communications multiplexer 20 to receive video information therefrom for coding, decoding, processing and display. The output of video processor 24 is communicated to the video I/O 18 by way of pixel bus PBUS.

Alternatively, video processor 24 may be configured as described in the Duran, et al. paper incorporated hereinabove. In this example, video processor 24 includes a bank of sixteen TMS320C25 digital signal processors manufactured and sold by Texas Instruments Incorporated, each associated with 64 k bytes of conventional dual port video DRAM memory devices connected thereto, and connected together in a multiple instruction, multiple data stream (MIMD) configuration. The digital signal processors in this arrangement are programmed to perform a transform based (discrete cosine transform, or DCT) video compression algorithm.

Further in the alternative, video processor 24 may be implemented as a video compression chip set, an example of which is available from LSI Logic, for coding and decoding the video information according to the proposed CCITT video coding standard H.261. Other known and equivalent circuits and arrangements may alternatively be used as video processor 24, for decoding and processing the video portion of the transmitted bit stream for display.

Also connected to bus ATBUS is a conventional disk controller 26, which in turn is connected to bulk disk storage 28, for example having 100 Mbyte or greater storage. Disk 28 will be the storage location for received messages according to this embodiment of the invention, as will be described in further detail hereinbelow.

Figure 3:
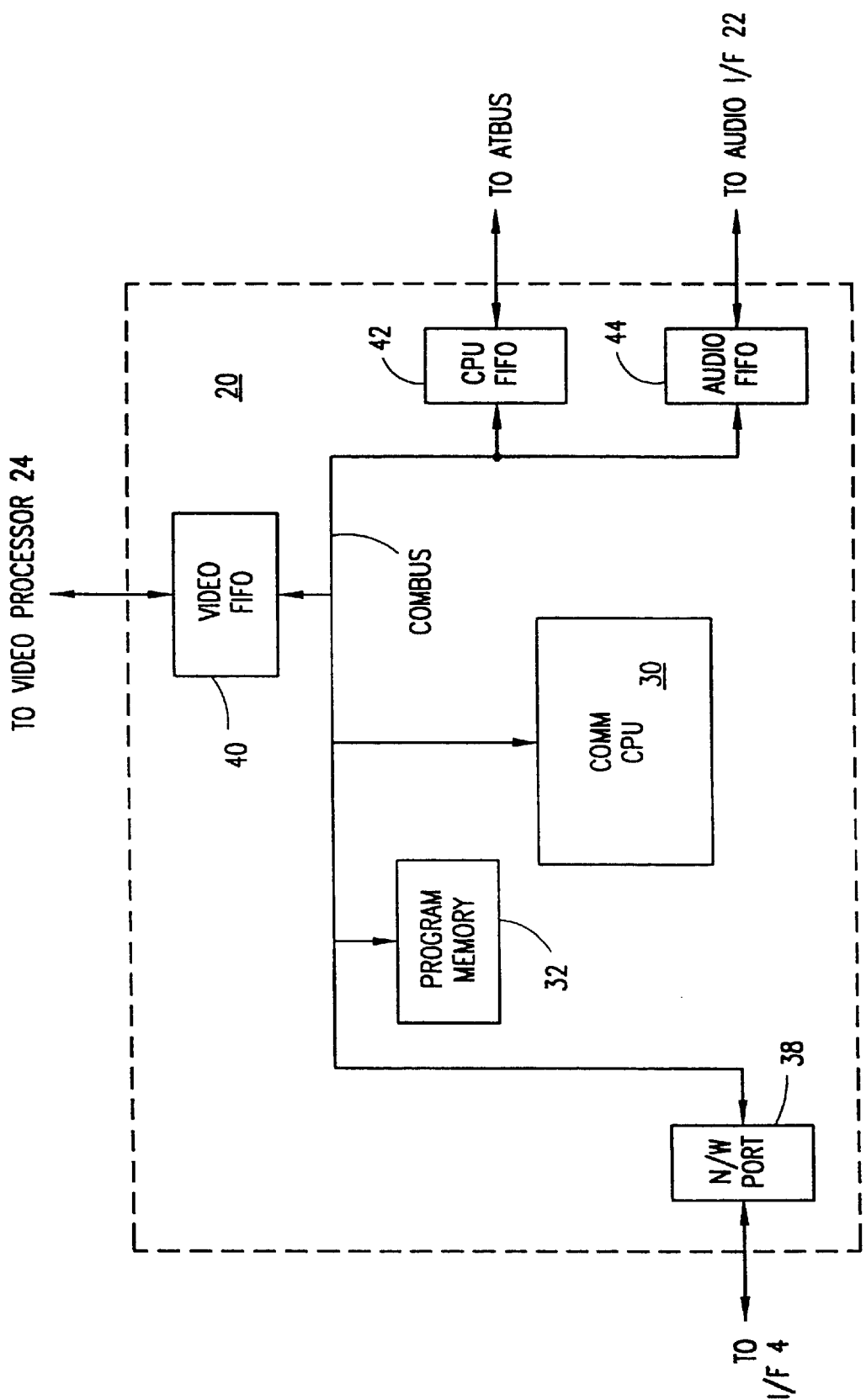
FIG. 3 is an electrical diagram, in block form, of the communications multiplexer in the computer of FIG. 2.

Referring now to FIG. 3, the construction of communications multiplexer 20 according to this embodiment of the invention will now be described in further detail. Communications multiplexer 20 includes a communications CPU 30, for example an i960CA RISC processor manufactured and sold by Intel, together with necessary on-chip or off-chip clock, memory, and support hardware. For example, a DMA control circuit may be provided within communications CPU 30, for controlling DMA operations between its memory and bus ATBUS. Communications CPU 30 is bidirectionally connected to bus COMBUS. Also connected to bus COMBUS is program memory 32, for storing the routines performed by communications CPU 30 according to this embodiment of the invention, or alternatively for storing a routine for initializing communications CPU 30 on power-up, in which case the routines are downloaded thereto by CPU 14 via bus ATBUS.

Network port 38, for example an RS-449 port or dual V.35 ports as noted hereinabove, is connected to bus COMBUS and is controlled by communications CPU 30. It should be noted that various user ports as noted above (e.g., a FAX port, RS-232 port, and another RS-449 port) may also be connected to bus COMBUS under the control of communications CPU 30, for communicating information between interface 4 of FIG. 2 and bus COMBUS; these ports will generally not be used in the receipt of a recorded message according to the method described hereinbelow, and as such are not shown in FIG. 3 for purposes of clarity. Network port 38 may include some amount of processing capability to facilitate the transmission of information between bus COMBUS and interface 4. For example, port 38 may include demultiplexing circuitry so that the bitstream data on bus COMBUS (e.g., at a data rate of 112 kbps) may be applied to interface 4 in such a manner as to support transmission of two lower speed channels of information having different delay periods.

Video FIFO 40 is also connected on one side to bus COMBUS, and is connected on the other side to video processor 24, to communicate received video data thereto for processing and display, and to receive video information therefrom for communication out of the network port. Similar buffering is provided by CPU FIFO 42 connected between bus COMBUS and bus ATBUS, and by audio FIFO 44 connected between bus COMBUS and audio interface 22.

Each of the functions (memory 32, port 38, and buffers 40, 42, 44) in communications multiplexer 20 are under the control of communications CPU 30, in any one of several conventional ways. For example, each of the functions connected to bus COMBUS may have an address value associated therewith which is within the memory space of communications CPU 30; accordingly, each of these functions may be selected for communication with bus COMBUS by way of an address value placed on certain lines of the bus, or in a manner which is time-multiplexed with data on bus COMBUS. Alternatively, control lines may be connected directly between communications CPU 30 and each of the functions separately from bus COMBUS, such that communications CPU 30 selects one of the functions for connection to bus COMBUS by way of signals generated on such control lines. It is contemplated that other system techniques by which communications CPU 30 may control the selection and enabling of each of the functions (memory 32, port 38, and buffers 40, 42, 44) within communications multiplexer 20 will now be apparent to those of ordinary skill in the art having reference to this description.

As described in the Duran et al. paper, the various types of data received and routed by communications multiplexer 20 are in multiplexed form, suitable for communication over bus COMBUS. These communication channels include an audio channel for receiving up to 64 kbps audio information, and a video channel with a bandwidth up to that of the communications channel bandwidth (typically 112 kbps or greater) less the bandwidth portion reserved for the audio channel. Certain other channels are used on an "on demand" basis, including a 64 kbps FAX channel, an RS-232 channel (from 0.3 to 19.2 kbps), and RS-449 channel (from 0.3 to 128 kbps). In addition, bus COMBUS also carries data from bus ATBUS, on demand. Via connection of bus COMBUS through RS-449 port 38, communications multiplexer 20 can transmit at speeds from 9600 bps to 768 kbps; conventional systems such as the CS420R system noted hereinabove are typically optimized at particular frequencies, for example 384 kbps, or one-fourth the bandwidth of a T1 communications line.

The transmitted message according to this embodiment of the invention includes data corresponding to multiple input/output media, as noted hereinabove. Depending upon the available bandwidth and the multiplexing arrangement, various conventional coding and compression schemes may be used for data of each type. For example, the data corresponding to the motion video portion of the message may be compressed according to CCITT recommendation H.261, which is a lossy compression scheme. Audio information, especially at lower data rates, will generally also be compressed, although the compression scheme will differ from that for motion video. Other data corresponding to other media may be coded as best suitable for the application, or may not be coded or compressed at all.

Figure 4:
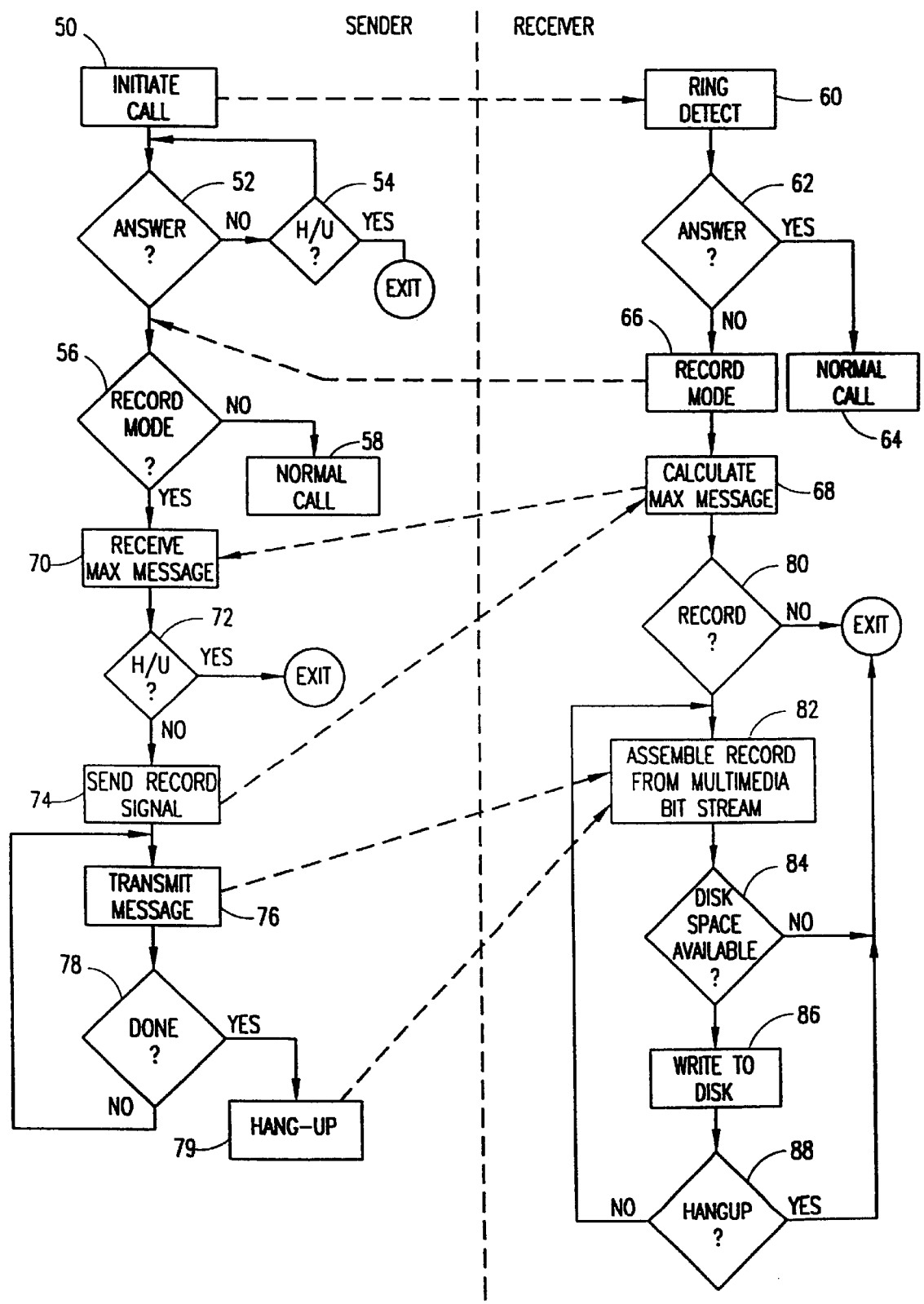
FIG. 4 is a flow chart illustrating the operation of the system of FIGS. 1 and 2 in storing a transmission for later retrieval.

Referring now to FIG. 4, the operation of systems 1, including CPU 14 and communications CPU 30 programmed according to this embodiment of the invention, in performing the function of transmission of a multi-media message and its storage for later retrieval, will now be described in detail. FIG. 4 includes a pair of flow charts, one for the sending system and one for the receiving system. It is contemplated that one of ordinary skill in the art, having reference to this specification, will be able to readily program CPU 14 and communications CPU 30 to perform the functions and operations described herein.

The communications network used in connection with this embodiment may be a switched (i.e., dial-up) network, a dedicated network, or another type of network such as a local-area-network (LAN). In the example of a switched network, the transaction begins with process 50, where the sending operator causes the sending system to initiate a telephone call over the digital communications network in the conventional manner. Part of the call initiation process may include selection of the data rate of the desired transmission and communication of this data rate to the receiving unit; alternatively, the data rate may be defined by the network. It should be noted that the CS420R system noted hereinabove, when used with a switched network, provides for user-friendly call initiation, including menu-driven destination selection and call placement. Upon receipt of the call, the receiving system detects a ring in process 60 and determines, in decision 62, whether or not a person on the receiving side has actively answered the call; if so, the normal call mode is entered, and the system functions in the conventional manner to perform a two-way or multiple-way conference, in process 64.

In the event no person actively answers the call, however, an automatic answer function will be performed on the receiving end (if enabled). In the automatic answer mode, if no person has answered the call after a selected number of rings, the receiving system will enter a record mode, in process 66, and will indicate to the sending unit that such a mode has been entered.

The indication of record mode provided by the receiving system will cause the sending system to exit a waiting loop. In the waiting loop, sending system determines in decision 52 if the call has been answered. If not, the sending system determines in decision 54 if the sending operator has hung up, exiting the call if such is the case. If the sending operator has not hung up, the waiting loop continues with decision 52. Upon receipt of the indication from the receiving unit that the call has been answered, the sending unit determines, in decision 56, if the receiver is in record mode or normal mode. Normal mode calls are processed in the conventional manner, shown as process 58.

The receiving system, once in record mode, has meanwhile interrogated its disk storage 28 (or other storage unit in which received messages are to be stored) to determine the length of message available for storage (process 68). The calculation of the maximum length message is preferably performed by dividing the space available in disk storage 28 by the data rate desired by the sending system to arrive at a maximum time duration which is available for the transmitted message. It should be noted that various other criteria may be used to determine the maximum message length, including a preselected limitation on the length of a particular message for all sender, or for particular senders. The calculated maximum message length is communicated to the sending system for receipt in process 70, and the receiving system awaits the reply.

At this point, the sending operator can decide whether or not to transmit a message based on the maximum message length information communicated by the receiving system, which is preferably displayed on one of the monitors 6 of the system. Other information may also be transmitted by the receiving system at this time, including identity information (e.g., "You have reached . . . ") and a timing message (e.g., "Please begin your message at the tone."). Alternatively, the receiving system may begin recording instantaneously with the initiation of the call. Decision 72 determines whether or not the sending operator has decided to hang up, in which case the process exits. If the sending operator has not hung up, process 74 transmits a record signal to the receiving system, indicating that a message is about to be transmitted for recording by the receiving system. Decision 80 of the receiving system will then pass control to the recording process, rather than exiting as would be the case if no record signal were transmitted by the sending system. The receiving system will then enter process 82, to await and process the message.

The sending system will then receive information from its various input devices, such as microphone 12, cameras 5, scanner or FAX input 7, graphics tablet 9, keyboard 10, and other inputs, including information processed by CPU 14 in computer 2 itself. Each of the input devices useful in a conventional video teleconference, as performed by the CS420R system noted hereinabove, may be transmitted by the sending system. In process 76, the sending system will send the combined information over network DCN in the conventional manner, as though a normal two-way multimedia conference were taking place. During this time, additional features such as display of the remaining message time available from the maximum message length sent by the receiving unit, may be incorporated. At such time as the message is complete, as determined by the sending operator in decision 78, the sending operator will merely hang up.

Figure 5:
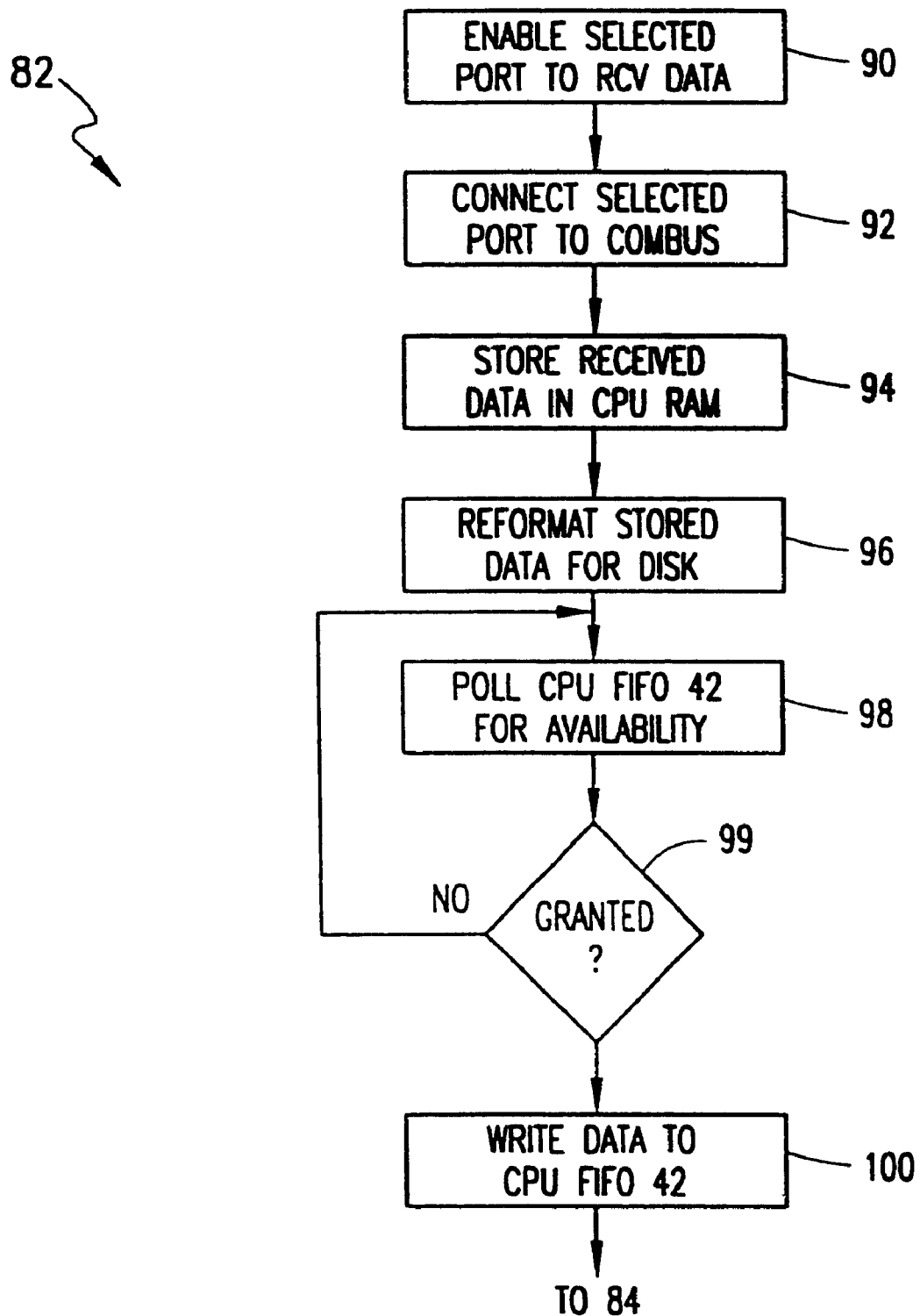
FIG. 5 is a flow chart illustrating the steps of storing data corresponding to the transmission.
Figure 6A:
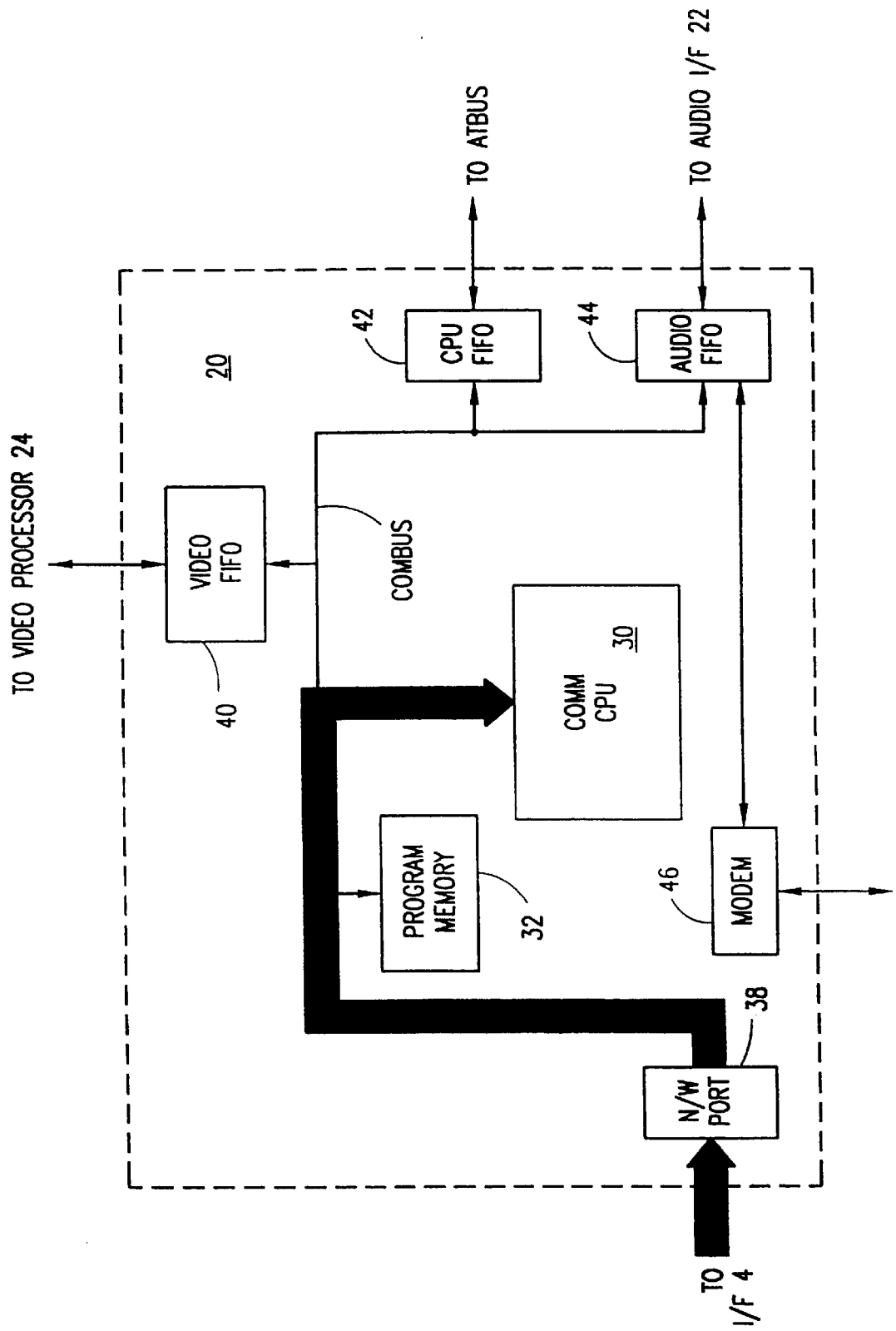
FIGS. 6a and 6b are electrical diagrams of the communications multiplexer of FIG. 3, illustrating the flow of data in the steps of FIG. 5.
Figure 6B:
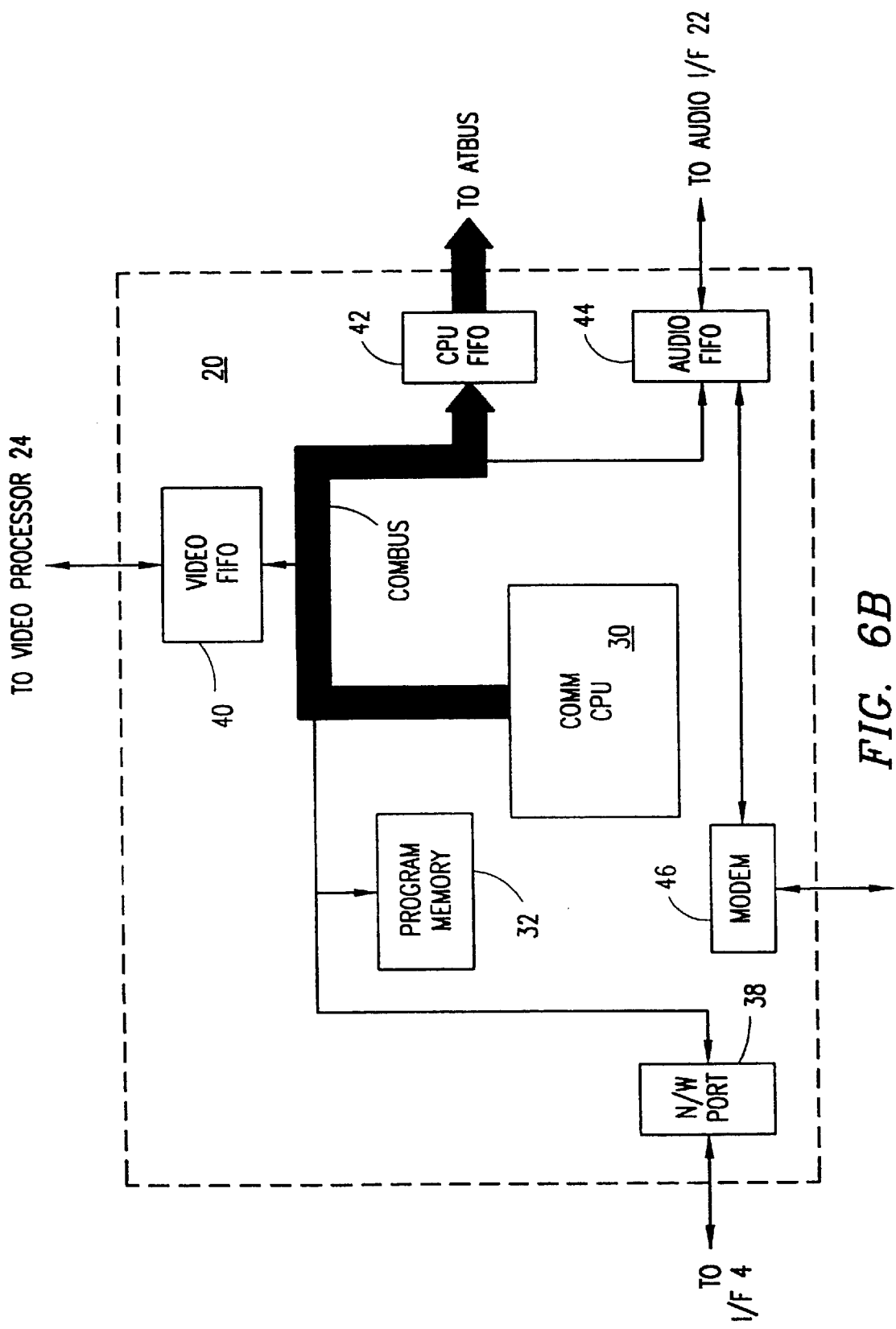

Referring now to FIG. 5, in conjunction with FIGS. 6a and 6b, the operation of process 82 in the receiving system, programmed according to this embodiment of the invention, by which transmission data from the sending system are received and stored for later retrieval, will now be described in detail. Referring first to FIG. 6a in combination with FIG. 5, process 82 begins with process 90, in which communications CPU 30 enables network port 38 to receive data from interface 4 and, in turn, from the sending system. In process 92, communications CPU 30 grants bus COMBUS access to network port 38, so that the data received thereby are placed on bus COMBUS. Communications CPU 30 receives the data from bus COMBUS, and stores the data in its memory, in process 94. The data flow from interface 4 to communications CPU 30 is illustrated in FIG. 6a.

The data received by communications CPU 30 in processes 90, 92, 94 may correspond to a single sample in time, or may correspond to a series of time samples, depending upon the memory capacity of communications CPU 30 (either on-chip or off-chip), the processing to be performed by communications CPU 30, and other factors. Accordingly, the flow of data illustrated in FIG. 6a may correspond to varying times of transmission. Regardless of the duration of the storage, communications CPU 30 processes the data stored in process 94, and reformats it into a conventional form suitable for storage in disk storage 28 of computer 2, as illustrated in FIG. 2. Certain information in addition to the transmitted data may be stored in conjunction with the data, an example of such additional information including the data rate at which the information was received. Reformatting may not be necessary in some applications, in which case process 96 (and, perhaps, process 94) is not applicable.

Once the data have been received by communications CPU 30 and stored within communications multiplexer 20, the storage of the received data in the memory of computer 2, preferably fixed non-volatile storage such as disk storage 28 of FIG. 2, can now be performed. Alternatively to disk storage 28, the message may be stored in other computer-accessible memory, such as random access memory in computer 2, or disk or RAM located in another computer or network and which is accessible by computer 2 (e.g., memory in a LAN server).

In this preferred embodiment, it should be noted that CPU 14 in computer 2 has preferably pre-assigned a location in disk storage 28 for the data to be received in the transmission, according to the usual steps and protocol for the operating system resident in computer 2. Referring now to FIG. 6b in combination with FIG. 5, process 98 is performed in which communications CPU 30 polls CPU FIFO 42 to determine its availability to receive data from bus COMBUS. Upon determining that CPU FIFO 42 can receive such data, communications CPU 30 then writes CPU FIFO 42 with a portion of its memory contents corresponding to the reformatted received data, for eventual transfer to bus ATBUS. Alternatively, the transfer of data may be performed by way of direct memory access (DMA), or by other program controlled I/O operations. The flow of data in communications multiplexer 30 during this portion of the operation is illustrated in FIG. 6b.

Referring back to FIG. 4, upon communications CPU 30 writing data into CPU FIFO 42, CPU 14 in computer 2 will have interrogated disk controller 26 to ensure that sufficient space remains available in disk storage 28 for storage of the new data (decision 84 in FIG. 4). If disk space is no longer available, the operation is terminated. If sufficient disk space remains, process 86 is performed by which CPU 14 polls CPU FIFO 42 to determine if it contains data to be read by CPU 14, and enables CPU FIFO 42 to begin placing this data onto bus ATBUS. CPU 14 further controls disk controller 26 to allow the data on bus ATBUS to be stored in disk storage 28, in association with a conventional file specification or other designation to facilitate its subsequent retrieval. The state of the line is again interrogated in decision 88 (either directly, or by determining whether or not data has been transmitted within a time-out period) to determine if the sending unit has hung up (in which case the process terminates), with process 82 repeating if the transmission is continuing. The loop of process 82, in which the received data are processed and stored, thus either continues until the available space in disk storage 28 is filled, or until completion of the multi-media message.

Figure 7:
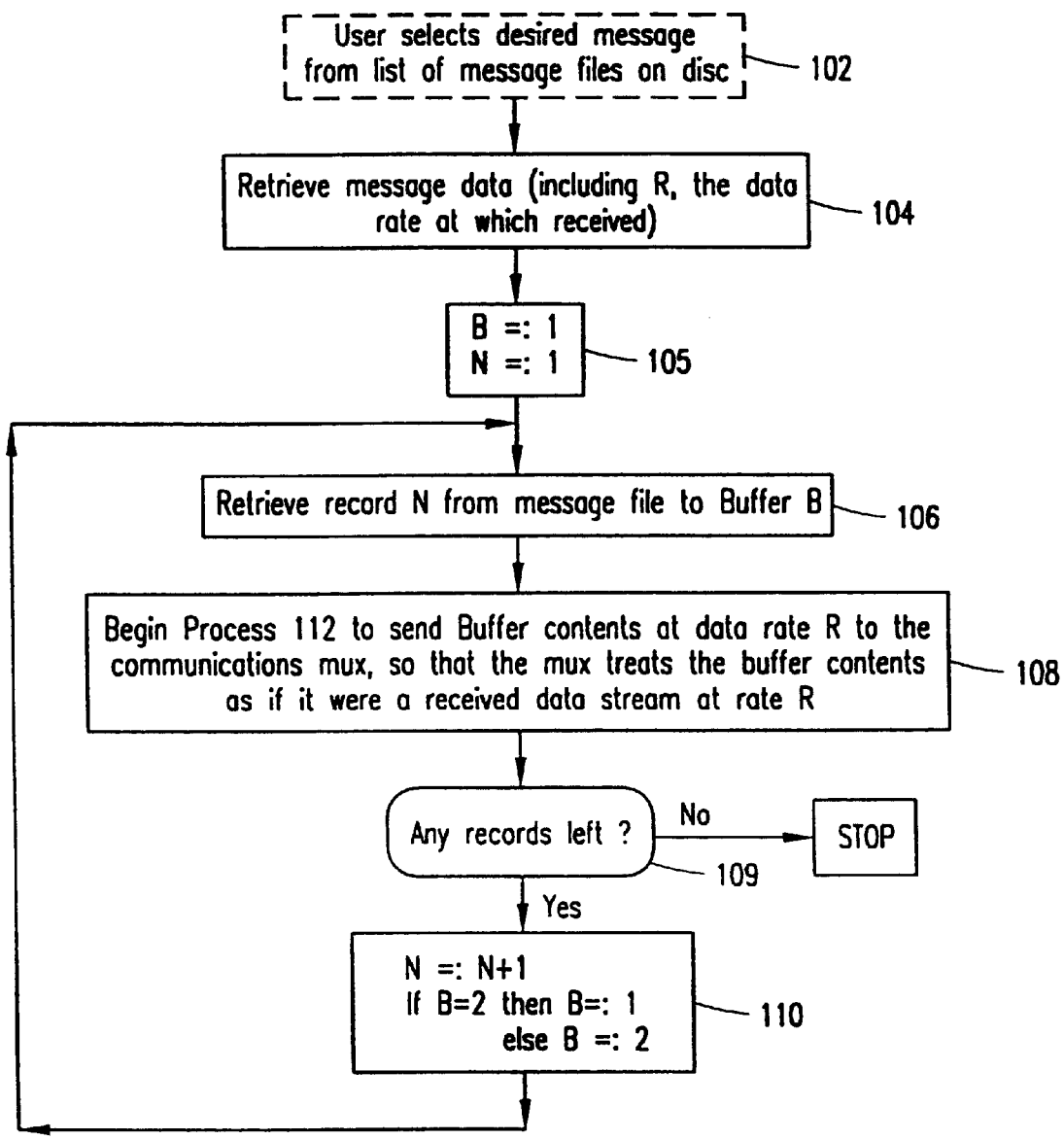
FIG. 7 is a flow chart illustrating the operation of the system of FIGS. 1 and 2 in retrieving a stored transmission.

Referring now to FIG. 7, the process of playback of a previously stored message will now be described. It is first contemplated that, upon completion of the transmitted message, the receiving system will indicate to its owner or user that a new message has been received and awaits review by the operator. Such indication may be made by way of displaying this status on a monitor or other visual indicator, or by other techniques such as an automatic phone call to the system manager. It is contemplated that a menu-driven system may be readily provided within the receiving system, such that the operator may view a menu of stored messages, and select one or more desired received messages for playback, illustrated as process 102 in FIG. 7.

Upon selection of a desired message for playback, CPU 14 will execute the necessary operating system instructions to access the associated memory locations in disk storage 28 of the data for the desired message. It should be noted that the retrieval and processing of the stored message must be done at sufficient speed that the system will display the message in real time. It is therefore preferred that the retrieval of data from disk storage 28 be buffered in a conventional manner (e.g., by way of a circular buffer, or double buffered as will be described hereinbelow), so that disk storage 28 may retrieve a number of records while other records are being transferred to communications multiplexer 20. It should be noted that the storage of the received message described hereinabove relative to FIGS. 5, 6a and 6b may also be performed in such a buffered manner, if necessary.

The example of retrieval of a stored message by way of a double buffered system will now be described in detail. It is contemplated that the selection of the buffering scheme will depend upon the data rate, the amount of buffer memory available, and the particular application. In the double buffered case, process 105 sets the state of a buffer pointer B to the value 1, and a record counter N to the value 1, prior to commencing retrieval of the data from disk storage 28. As will be evident hereinbelow, the number of records associated with a message will be stored by CPU 14 so that the end of the retrieval process can be determined. In process 106, the record N is retrieved from disk storage 28, and stored in buffer B in the memory of CPU 14, according to the values of the buffer pointer and record counter. Each record N may consist of a series of time samples at the stored data rate, and as such corresponds to a period of time in the stored message. The size of a typical record according to this embodiment of the invention is contemplated to be on the order of 4 kbytes. In process 108, once the pointed-to buffer B receives record N, process 111 of FIG. 8 is initiated by communications multiplexer 20 in conjunction with CPU 14, in which the contents of record N are displayed by the receiving system for viewing by the recipient of the message.

Figure 8:
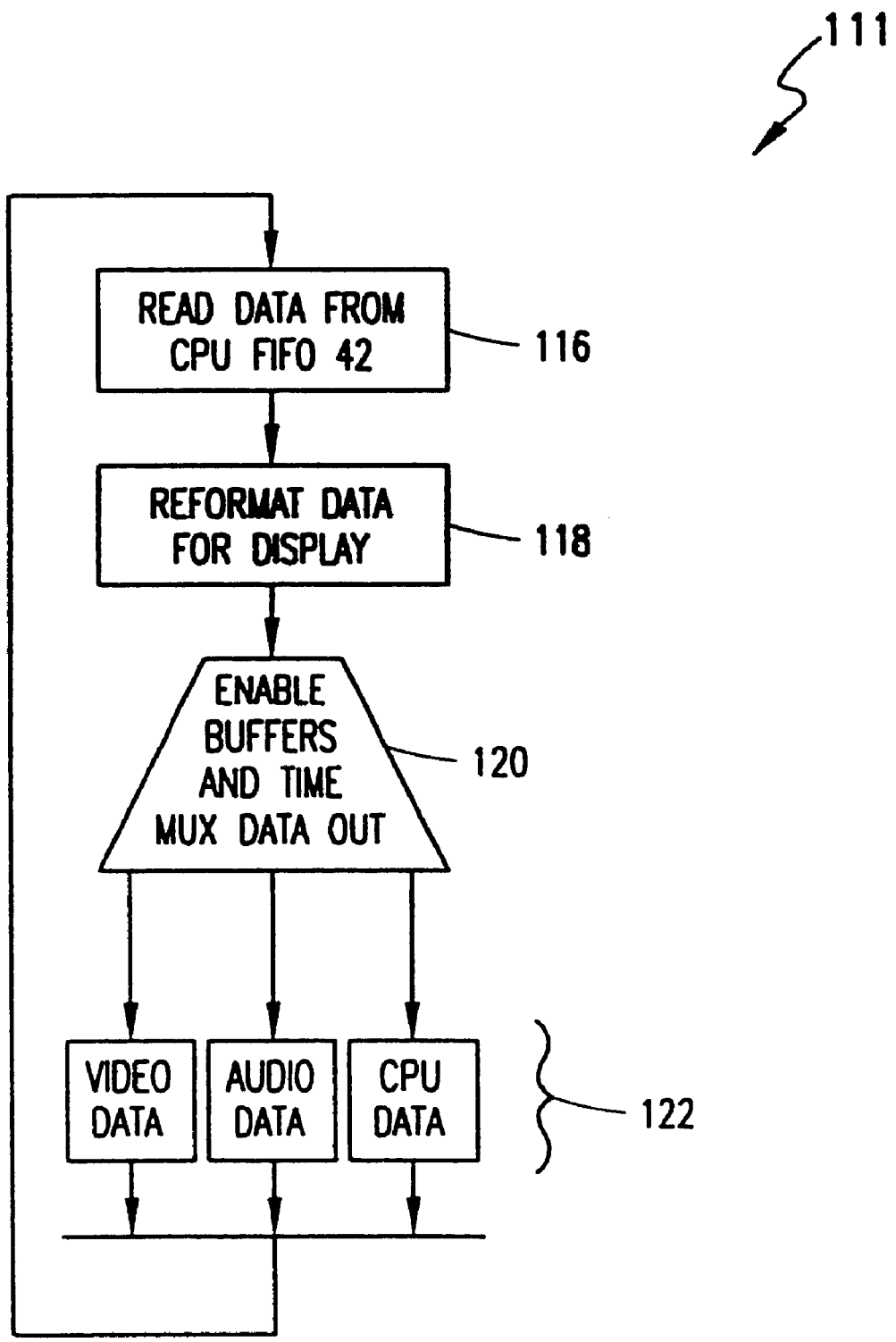
FIG. 8 is a flow chart illustrating the steps of retrieving data corresponding to the stored transmission.
Figure 9A:
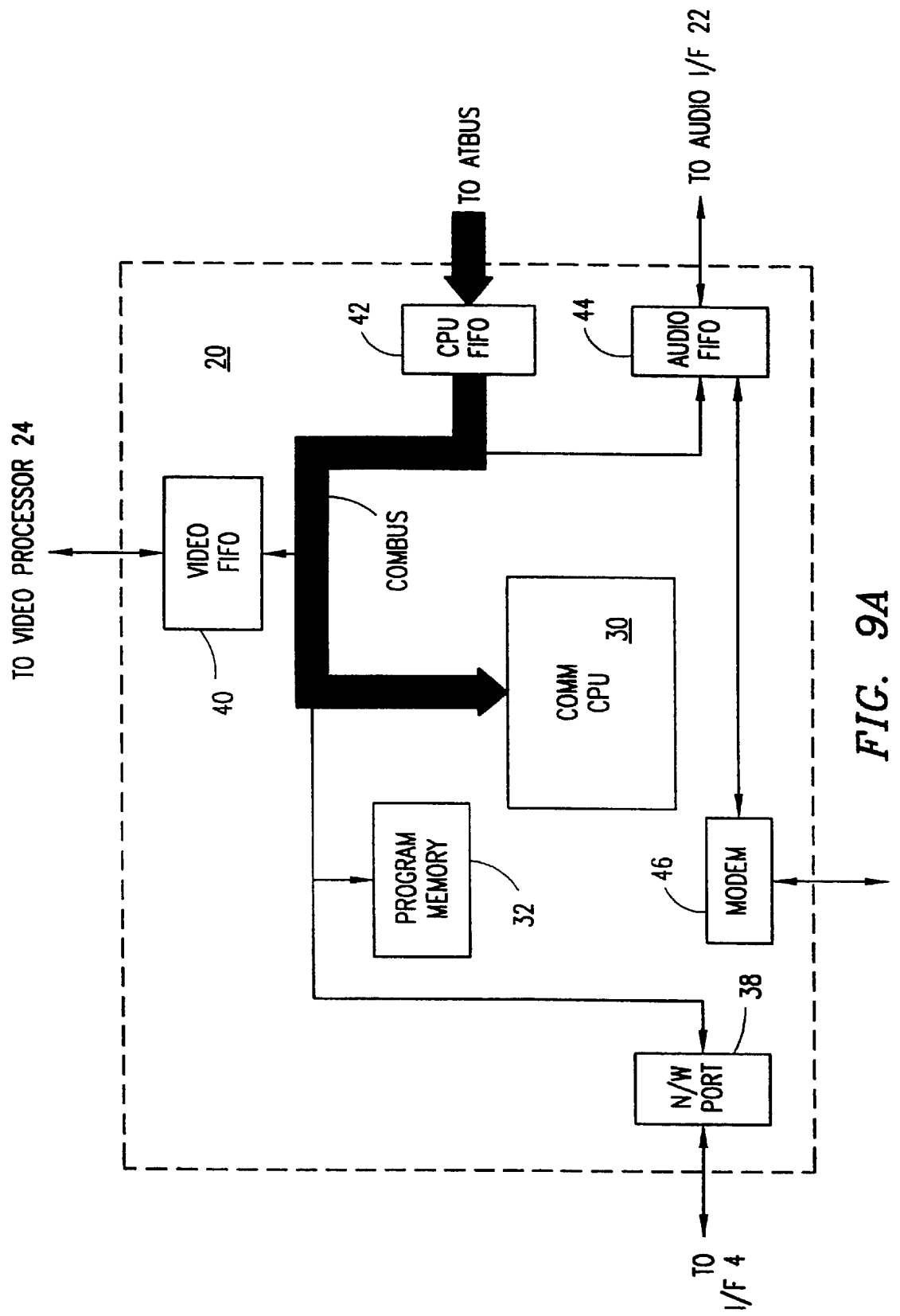
FIGS. 9a and 9b are electrical diagrams of the communications multiplexer of FIG. 3, illustrating the flow of data in the steps of FIG. 8.

Referring now to FIG. 8, in combination with FIG. 9a, the operation of communications multiplexer 20 in the receiving system will now be described during the playback mode. In parallel with process 111 of FIG. 8, CPU 14 writes the data to be transferred into CPU FIFO 42 by way of bus ATBUS, after polling CPU FIFO 42 for its availability in the conventional manner. It is preferred that the priority of the playback operation be quite high, so that the real-time effect of the retrieved message is maintained.

Communications CPU 30 reads the contents of CPU FIFO 42 in process 116, during which CPU FIFO 42 places the received data onto bus COMBUS for storage in the memory of communications CPU 30. The data flow for this operation is illustrated in FIG. 9a. After receipt of the data from bus COMBUS, communications CPU 30 reformats the data into a form suitable for decoding, processing and output by the various functions (process 118).

It should be noted that the transfer of data from disk storage 28 back into communications CPU 30 for playback may alternatively be performed by way of direct memory access (DMA). Further in the alternative, other program controlled I/O operations may be used to transfer the data from bus ATBUS to communications CPU 30.

Figure 9B:
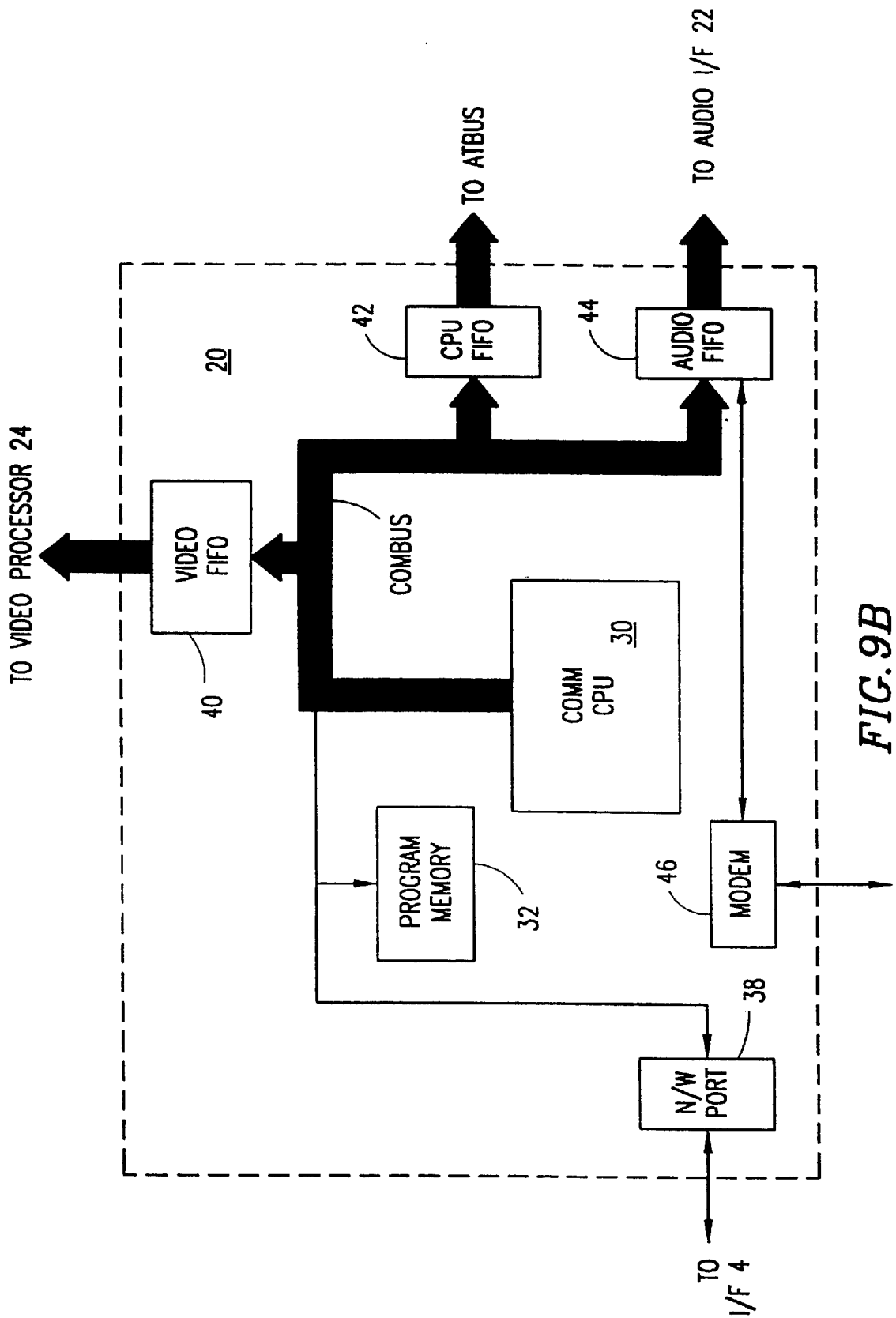

The reformatted data in the memory of communications CPU 30 are then placed onto bus COMBUS in time-multiplexed form, in combination with the enabling of the various functions connected to bus COMBUS to receive the reformatted data and communicate the same to their respective destinations (process 120). The time-multiplexing performed by communications CPU 30 is identical to that performed for real-time message information being received from a sending unit; as a result, the information forwarded to the video, audio, and CPU portions of the receiving system is presented as though the message were incoming at that time. Process 122 indicates the time-multiplexing of data on bus COMBUS, for receipt by video buffer 40, audio buffer 44, and CPU buffer 42. Decoding and processing of the video data by video processor 24, audio interface 22, and CPU 14, is then performed in the same manner as during receipt of live teleconferencing data. The most direct data flow for this operation is illustrated in FIG. 9b for clarity; alternative paths, such as sending the data to network port 38 and its replacement onto bus COMBUS, may be preferred depending upon the timing requirements of the particular system and for ease of programming. Upon completion of the time-multiplexed output of process 122, communications CPU 30 then polls CPU FIFO 42 to determine if new data are present therein, and reads such data, if such is the case, in process 116, for playback of the next record.

Referring back to FIG. 7, during such time as the output of data by communications multiplexer 20 is occurring, CPU 14 compares the value of record N against the terminal value to determine if additional records are to be transmitted to communications multiplexer 30; if not, the process terminates. If additional records remain, the record counter is incremented, and the other buffer (i.e., not the buffer from which DMA is currently taking place) is selected. Process 106 is then performed, in which the next record is retrieved from disk storage into the buffer, followed by process 108 at such time as CPU FIFO 42 is available to receive the next record.

It is contemplated that transmission errors may occur during the transmission of a message for storage, as in the case of live teleconferences. Correction of the data stream for such errors is useful in live teleconferences, but is not critical, as the receiving party is able to ask the sending party to repeat himself or herself, or to retransmit the data, if the errors are of sufficient extent to affect the meaning of the communication. In the above-described process of transmission and storage of a message for later retrieval, however, the recipient is not available to ask for retransmission or repetition of the message. Accordingly, it is preferred that some type of on-line error correction be utilized by the receiving system.

Various approaches to error correction are contemplated for use with the present invention. A first approach would be to apply conventional forward error correction techniques to the incoming bit stream, either by way of communications CPU 30 in reformatting process 96 described hereinabove, or by special network interface circuitry. Such forward error correction, as is well known, is not sufficient to correct all errors of a particularly serious nature.

A second approach to error correction contemplated for use in the present invention is the use of an error checking protocol, such as the well-known HDLC protocol, which has the capability of detecting corrupted data packets, and requesting the sending system to retransmit the bad packets. According to this approach, communications multiplexer 20 would transfer only non-corrupted data packets to bus ATBUS for storage in disk storage 28, so that no corrupted data packets would be received by communications multiplexer 20 during playback; data packets would then be re-transmitted similarly as in a conventional interactive video teleconference which employs such a retransmission protocol.

Of course, transmission errors may merely be ignored. Errors in video and audio transmission, while causing temporary disruption of the played-back message, will generally not be fatal to the system as the video and audio compression algorithms will eventually recover after the error. It should be noted, however, that data transfers, such as spreadsheet or graphics information, may be received and stored in a corrupted fashion if errors are merely ignored.

It is further contemplated that additional interaction between the sending and receiving systems may be provided to enhance the quality of the stored message. For example, analogously to conventional voice mail systems, some amount of editing capability may be provided in the receiving system at the initiation and control of the sending operator. Such editing may allow for playback of the stored message at any time during its transmission, together with the ability to re-record some or all of the message transmitted at that time. Initiation of such editing may be provided by transmission of a particular command by the sending system which is received, decoded and executed by the receiving system; alternatively, an edit function may be provided upon completion of the transmission.

Further in the alternative, it is contemplated that the present invention may be practiced by way of transmission of a multiple-media message from a sending teleconference system directly to computer storage, rather than to a receiving teleconference system as described hereinabove. The computer storage may be located at the sending system and accessible by a receiving teleconference system, located at the receiving system, or at another location accessible by both. The sending system may then communicate the existence and location (address, file specification, or the equivalent) of the stored message, by way of a conventional phone call, letter, telex, FAX, or even a brief multiple medium message as described hereinabove, to the receiving system. The receiving system may "playback" the message at a later time by accessing the appropriate storage unit and receiving the stored bitstream through its network port as though a real-time incoming message were being received, with display of the multiple medium message occurring in the same manner. The receiving system may alternatively download the stored bitstream data into its own storage, for playback at a later time through its communications multiplexer 20 in the manner described hereinabove relative to FIGS. 7, 8, 9a and 9b.

It should further be noted that while a two-party transmission is described hereinabove, the present invention is also applicable to multiple-party message storage and retrieval. For example, the sending operator may record a message in the sending system itself, in similar manner as the receiving system receives and stores a message; at the desired transmission time, the data stream may be transmitted to one or multiple systems in the format in which it was stored in disk, without requiring the communications multiplexers 20 in the receiving systems to reformat the transmitted message.

Alternatively, or in addition, the sending system may utilize a system, such as a Multipoint Control Unit, which is capable of dialing several locations at once, and communicating the message to each for storage thereat. This allows for a broadcast multiple medium message to be transmitted for later retrieval at each receiving location, according to the recipients' particular schedules and needs.

The above-described system and method thus provides the capability for the transmission of a multiple medium message for storage and later retrieval and playback. The ability of parties to fully communicate their desired messages using the most appropriate media is thus improved, as scheduling conflicts are avoided. Furthermore, the recipient of the message is able to view the message at his convenience, and in the order desired (if multiple messages have been stored). The communications between the sending and receiving unit, particularly relative to the maximum message length, further enhances the ability for meaningful messages to be transmitted.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of recording and playing back in a multimedia device an audio and video stream of data comprising the steps of:

accepting at least one audio and video stream of data transmitted via a communication system to said multimedia device;

buffering said accepted at least one audio and video stream of data;

controlling, the storage of said at least one audio and video stream of data into a random access mass storage device, the so buffered audio and video stream of data into a the random access mass storage device, under the control of a micro-processor such that multiple audio and video streams of data are stored on said random access mass storage device and wherein any given stored audio and video stream so stored is individually retrievable from the random access mass storage device;

automatically creating a selection list of the plurality stored multiple audio and video streams;

providing a user controllable signal to said micro-processor to select among the so listed multiple audio and video streams so as to play back at least one of said store audio and video streams of data stored in said mass storage device in response to a user signal;

wherein the play back is of an individually retrievable one of said at least one of said stored audio and video stream of data and such that a play back of a so selected stored audio and video stream can occur during an accepting, buffering and storing of a combined audio and video stream of data of a different individually retrievable audio and video stream of data, and wherein said different individually retrievable audio and video stream of data is different from, at least relative in time from said played back portion of the combined video and audio stream of data and wherein the creation of the selection list of said stored plurality of audio and video streams is performed by said micro-processor based upon said received audio and video stream.

2. A method as in claim 1 wherein said accepting said at least one audio and video stream is via a digital communications medium.

3. A method as in claim 1 wherein said random access mass storage device is a computer hard disk drive.

4. A method of recording and playing back, in a multimedia device, an audio and video stream of data comprising the steps of:

selectively controlling via software the acceptance of an audio and video stream of data transmitted from a remote location, via a communication system to said multimedia device;

buffering said accepted audio and video stream of data in random access memory;

controlling the storage of said audio and video stream of data, buffered in said random access memory such that said buffered streams of data are stored on a random access mass storage device, under the control of a micro-processor such that a plurality of stored audio and video streams are stored in as separately retrievable segments;

automatically creating a selection list of the plurality stored multiple audio and video streams providing a user controllable signal to said micro-processor to play back at least one of said stored audio and video streams of data stored in said random access mass storage device;

wherein a play back of said at least one of said stored audio and video streams of data can occur during the accepting,
      buffering and
      storing of a combined video and audio stream of data which is different from said played back combined video and audio stream of data and
      wherein said storing and retrieval of said segments is controlled by software;

further wherein said play back is in response to a users signal selecting one of said plurality of stored audio and video streams stored on said random access mass storage device; and wherein the creation of the selection list of said stored plurality of audio and video streams is performed by said micro-processor based upon said received audio and video stream.

5. A method as in claim 3 wherein said random access mass storage device is a computer hard disk drive.

6. A software control method of recording and playing back segments of an audio and video stream of data comprising the steps of:

selectively controlling via software the acceptance of discrete segments of an audio and video stream of data transmitted from a remote location;

buffering said accepted segments audio and video stream of data in random access memory;

controlling the storage of said audio and video stream of data, buffered in said random access memory such that said audio and video stream of data is stored to on a random access mass storage device, under the control of a micro-processor such that a plurality of segments are stored and said stored segments are separately retrievable;

automatically creating a selection list of the each of the separately retrievable segments among the plurality of stored multiple audio and video streams;

providing a signal to said micro-processor to play back at least one of said stored audio and video streams of data stored in said random access mass storage device;

wherein a play back of said at least one of said stored audio and video streams of data can occur during the accepting, buffering and storing of a combined audio and video stream of data and wherein said storing and retrieval of said segments is controlled by software;

wherein said play back is in response to a users signal selecting one of said plurality of stored audio and video streams stored on said random access mass storage device and wherein the creation of the selection list of said stored plurality of audio and video streams is performed by said micro-processor based upon said received audio and video stream.

7. A method as in claim 6 wherein said random access mass storage device is a computer hard disk drive.

* * * * *